(12) United States Patent
Meincke et al.

(10) Patent No.: US 11,511,505 B2
(45) Date of Patent: Nov. 29, 2022

(54) METHOD AND DEVICE FOR POST-TREATING TYRES

(71) Applicant: HARBURG-FREUDENBERGER MASCHINENBAU GMBH, Hamburg (DE)

(72) Inventors: Ruediger Meincke, Hamburg (DE); Martin Nowok, Hamburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 697 days.

(21) Appl. No.: 16/071,127

(22) PCT Filed: Oct. 13, 2016

(86) PCT No.: PCT/DE2016/000372
§ 371 (c)(1),
(2) Date: Jul. 19, 2018

(87) PCT Pub. No.: WO2017/129156
PCT Pub. Date: Aug. 3, 2017

(65) Prior Publication Data
US 2021/0162694 A1    Jun. 3, 2021

(30) Foreign Application Priority Data
Jan. 26, 2016 (DE) .................. 10 2016 000 959.4

(51) Int. Cl.
*B29D 30/06* (2006.01)
(52) U.S. Cl.
CPC ..... *B29D 30/0643* (2013.01); *B29D 30/0662* (2013.01); *B29D 2030/0677* (2013.01)

(58) Field of Classification Search
CPC ................................. B29D 30/0643
USPC ....................................... 425/58.1
See application file for complete search history.

(56) References Cited

U.S. PATENT DOCUMENTS

| | | | |
|---|---|---|---|
| 2,340,264 A | 1/1944 | Freeman | |
| 3,645,660 A * | 2/1972 | Hugger | B29D 30/0643 425/445 |
| 3,692,444 A * | 9/1972 | Hugger | B29D 30/0643 425/58.1 |
| 4,092,090 A * | 5/1978 | Yuhas | B29D 30/0643 425/58.1 |

(Continued)

FOREIGN PATENT DOCUMENTS

| DE | 102009003447 A1 | 8/2010 |
|---|---|---|
| DE | 102014001644 A1 | 8/2014 |

(Continued)

OTHER PUBLICATIONS

Translation of JP-2001315129-A (Year: 2001).*

Primary Examiner — Xiao S Zhao
Assistant Examiner — John J DeRusso
(74) Attorney, Agent, or Firm — Lucas & Mercanti, LLP; Klaus P. Stoffel (57) ABSTRACT

A method and a device for post-treating tyres after a vulcanization process, which supports slow and controlled cooling of the finished tyre containing residual heat from a first to a second temperature level within an insulating chamber of a PCD and with the optional use of internal tyre pressure by a support gas as part of a PCI function.

16 Claims, 9 Drawing Sheets

(56) References Cited

U.S. PATENT DOCUMENTS

| | | | | |
|---|---|---|---|---|
| 5,198,234 A * | 3/1993 | Siegenthaler | ...... | B29D 30/0643 |
| | | | | 425/58.1 |
| 5,204,049 A * | 4/1993 | Siegenthaler | ...... | B29D 30/0005 |
| | | | | 264/326 |
| 5,250,252 A * | 10/1993 | Siegenthaler | ...... | B29D 30/0643 |
| | | | | 264/237 |
| 5,622,669 A | 4/1997 | Dailliez et al. | | |
| 6,214,280 B1 * | 4/2001 | Delmoro | ............ | B29D 30/0643 |
| | | | | 264/502 |
| 6,322,342 B1 * | 11/2001 | Mitamura | ........... | B29C 35/0222 |
| | | | | 264/236 |
| 6,660,212 B1 * | 12/2003 | Balter | ................ | B29D 30/0633 |
| | | | | 264/236 |
| 7,740,464 B2 | 6/2010 | Militzer et al. | | |
| 2016/0009041 A1 | 1/2016 | Zimmermann | | |

FOREIGN PATENT DOCUMENTS

| | | | | |
|---|---|---|---|---|
| EP | 0468343 A1 | | 1/1992 | |
| EP | 0468344 A1 | | 1/1992 | |
| EP | 0638409 A1 | | 2/1995 | |
| JP | 58-173639 | * | 10/1983 | |
| JP | H06238669 A | | 8/1994 | |
| JP | H11254445 A | | 9/1999 | |
| JP | 2001315129 A | * | 11/2001 | ......... B29D 30/0643 |
| JP | 2006167932 A | | 6/2006 | |
| JP | 2008155567 A | | 7/2008 | |
| WO | 2007079723 A1 | | 7/2007 | |

* cited by examiner

METHOD AND DEVICE FOR POST-TREATING TYRES

The present application is a 371 of International application PCT/DE2016/000372, filed Oct. 13, 2016, which claims priority of DE 10 2016 000 959.4, filed Jan. 26, 2016, the priority of these applications is hereby claimed and these applications are incorporated herein by reference.

BACKGROUND OF THE INVENTION

The invention relates to a method and a device for post-treating tyres after a vulcanization process, which supports slow and/or quick cooling of the finished tyre containing residual heat with the optional use of internal tyre pressure by means of a support gas.

One of the essential production steps for the production of tyres is the vulcanization of green tyres. For this purpose, the green tyre is placed in a mold situated within a tyre vulcanizing machine and is then heated to the material-dependent vulcanizing temperature and subjected to a vulcanizing pressure on the inside of the green tyre. To reach the vulcanizing temperature and the vulcanizing pressure, a suitable heating medium is introduced at an appropriate temperature and under pressure into the interior of the green tyre. The green tyre is usually fixed within the mold by means of a device in such a way that a largely pressure-tight chamber is formed within the green tyre.

The green tyre is already a highly complex component consisting of a large number of semifinished elements, as is the finished tyre as the end product of the tyre production process. Owing to the multilayered construction and the resulting differences in wall thickness, there are special requirements for the introduction of the vulcanizing temperature and the cooling of the finished tyre after vulcanization.

To carry out vulcanization of the elastomeric material, a considerable amount of thermal energy must be introduced into the material. In this process, the process time is determined by the thicker material regions since it takes longer to introduce a sufficient amount of thermal energy here.

The treads are particularly thick regions of the green tyre. The side walls are of relatively thin construction. The reason for this significant difference in thickness is the additional tyre components arranged in the region of the tread such as steel belts, the belt covering layer and the rubber/unvulcanized rubber layer, which is considerably thicker them the side wall. This considerably thicker rubber/unvulcanized rubber layer has a greater wall thickness, not least because it comprises the actual tyre profile which is produced during the vulcanization process. For this purpose, the tread region or the thick-walled rubber/unvulcanized rubber mass provided there must be heated to such an extent that it can flow plastically and can be forced into the negative profile die of the green tyre mold of the tyre vulcanizing machine by the vulcanization pressure.

Fundamentally, the aim of vulcanization is to heat a green tyre by the action of temperature and pressure within one or more time intervals to make it dimensionally stable, i.e. to join the components of the green tyre together and to impart elastic properties to the basic materials and to the rubber/unvulcanized rubber layer by cross-linking processes. For this purpose, there is a requirement not only for the actual action of pressure and temperature but also for various additive substances matched to the basic material for cross-linking and possibly for acceleration of cross-linking. Possible examples of cross-linking substances that are suitable are disulfur dichloride (sulfur vulcanization particularly in the case of natural rubber), peroxides or metal oxides, while additives based on mercaptobenzthiazole or zinc dithiophosphate are suitable for accelerating cross-linking.

After the vulcanization process, the green tyre vulcanized to give the finished tyre is removed from the tyre vulcanizing machine. The aim is to remove the tyre at the earliest possible time after the vulcanization process to enable the tyre vulcanizing machine to be supplied with a new green tyre to be vulcanized and in this way to reduce process cycle times and/or increase or maximize the output of the machine.

The inevitable result of this early as possible removal of the tyre after the vulcanization process is that the finished tyre has not yet or not yet completely cooled down and is at a high temperature owing to the considerable amount of thermal energy previously introduced for the vulcanization process. This "residual heat" can result in tyre temperatures of over 100° C. Depending on the type of tyre and the material, residual temperatures of the tyre upon removal from the tyre vulcanizing machine of about 160° C., and in some cases even higher, are possible. In practice, this means that the tyre vulcanizing temperature Tvulk is in many cases 150 to 190° C., preferably 160 to 180° C. The residual temperature of the tyre Trest during or after removal of the finished tyre from the tyre vulcanizing machine generally corresponds to Tvulk minus 0 to 10%.

Depending on the type of tyre, intended use and material properties as well as the wall thicknesses of the finished tyre, it may be necessary for the finished tyre removed from the tyre vulcanizing machine to be subjected to a post-treatment in a tyre post-treatment device. Particularly to achieve very tight dimensioning tolerances and/or very good concentricity properties, it may be necessary to cool the finished tyre removed under an applied internal pressure. For this purpose, the finished tyre still containing residual heat is accommodated in a tyre post-treatment device, referred to as a post-cure inflator (PCI), and subjected to an excess internal pressure by means of a support gas. The support gas is preferably compressed air at an excess pressure of up to 0.5 MPa.

Often, accurate tyre dimensioning tolerances, concentricity properties and/or levels of balancing accuracy, generally specified by high uniformity values, are not achieved in this way without carrying out post-treatment of the finished tyres in the PCI to meet these requirements and thereby eliminate rejects.

Another measure in connection with the post-treatment of fully vulcanized tyres after removal from the mold of the tyre vulcanizing machine is cooling in order as far as possible to remove the residual heat of the tyre, i.e. to cool the finished tyre to room temperature.

The aim of cooling is to lower the residual temperature of the tyre to the ambient temperature level and is preferably performed in a continuous process step corresponding to a time period of one to two heating cycles of the tyre vulcanizing machine.

Modern tyre designs and the materials thereof as well as the geometric dimensions, especially wall thicknesses and wall thickness changes, increasingly require tyre post-treatment measures, which are directed toward controlled slower cooling of the finished tyre containing residual heat. Previous post-treatments with the aim of quicker cooling may not be sufficient in many cases and/or may be disadvantageous for the finished tyre in respect of quality, levels of dimensional accuracy and material properties as well as cross-linking and unwanted reversion. The environmental protection aspect and the associated primary requirement for energy-saving and/or more efficient energy usage cannot be supported to a sufficient extent with known tyre post-treatment devices either.

SUMMARY OF THE INVENTION

It is an object of the invention to provide a device for post-treating tyres following a tyre vulcanization process in order to at least partially reduce the disadvantages mentioned and to provide a solution for new quality requirements.

The teaching according to the invention recognizes that tyre quality and/or energy efficiency can be improved by slow cooling in particular cool in stages under control or monitoring, of the finished tyre containing residual heat to room temperature. Provision is optionally made to combine the PCI process steps at least partially with the process steps of slow cooling, in particular cooling stages under control or monitoring, the finished tyre containing residual heat to loom temperature.

Slow monitored cooling in the sense according to the invention is taken to mean cooling in at least two heating cycles lasting at least 20 minutes carried out by means of Step 1: cooling of the finished tyre containing residual heat to a controlled temperature level between the vulcanization temperature and the ambient temperature, i.e. an intermediate temperature Tzw, in an insulated chamber according to the invention in a time period of about two heating cycles of the tyre vulcanizing machine.

It is possible to supplement the slow monitored cooling with normal cooling by means of Step 2: cooling the finished tyre from the intermediate temperature level Tzw to the discharge temperature by normal cooling of the environment for at least one heating cycle.

Step 1, comprising slow cooling within the insulated chamber, can preferably be implemented as controlled or monitored cooling, wherein, in particular, the insulated chamber surrounding the finished tyre to be cooled creates a climate without disruptive influences of an ambient air temperature and/or air speed from the environment, e.g. due to workshop ventilation at various times of year and/or higher air speeds due to drafts at open workshop doors, for example.

In terms of design, the proposal is to further develop the tyre post-treatment device in the form of a post-cure inflator (PCI) and to provide it with encapsulated chambers with insulation properties for the reception of the finished tyre containing residual heat. The encapsulated Chambers are designed in such a way that they ensure slow or controlled cooling of the finished tyre from the residual heat level to the intermediate temperature. The chambers are preferably constructed of multiple parts and can be opened and closed in order to be loaded and emptied. This novel cooling system for finished tyres containing residual heat is referred to as a post-cure device (PCD) and, in particular, supports combination with the PCI.

Through the use of a PCD and, optionally, the combination of a PCD and a PCI, it is possible at least in part to achieve advantages and improvements in respect of the shortening of the vulcanization time, improvement of tyre quality, enhancement of the levels of dimensioning accuracy and material properties, the degree of cross-linking of the unvulcanized rubber material and the suppression or reduction of unwanted reversion processes and the at least partial exploitation of the residual heat as an energy source.

BRIEF DESCRIPTION OF THE DRAWING

Illustrative embodiments of the invention are shown in the drawings, in which.

DETAILED DESCRIPTION OF THE INVENTION

Figure 1:
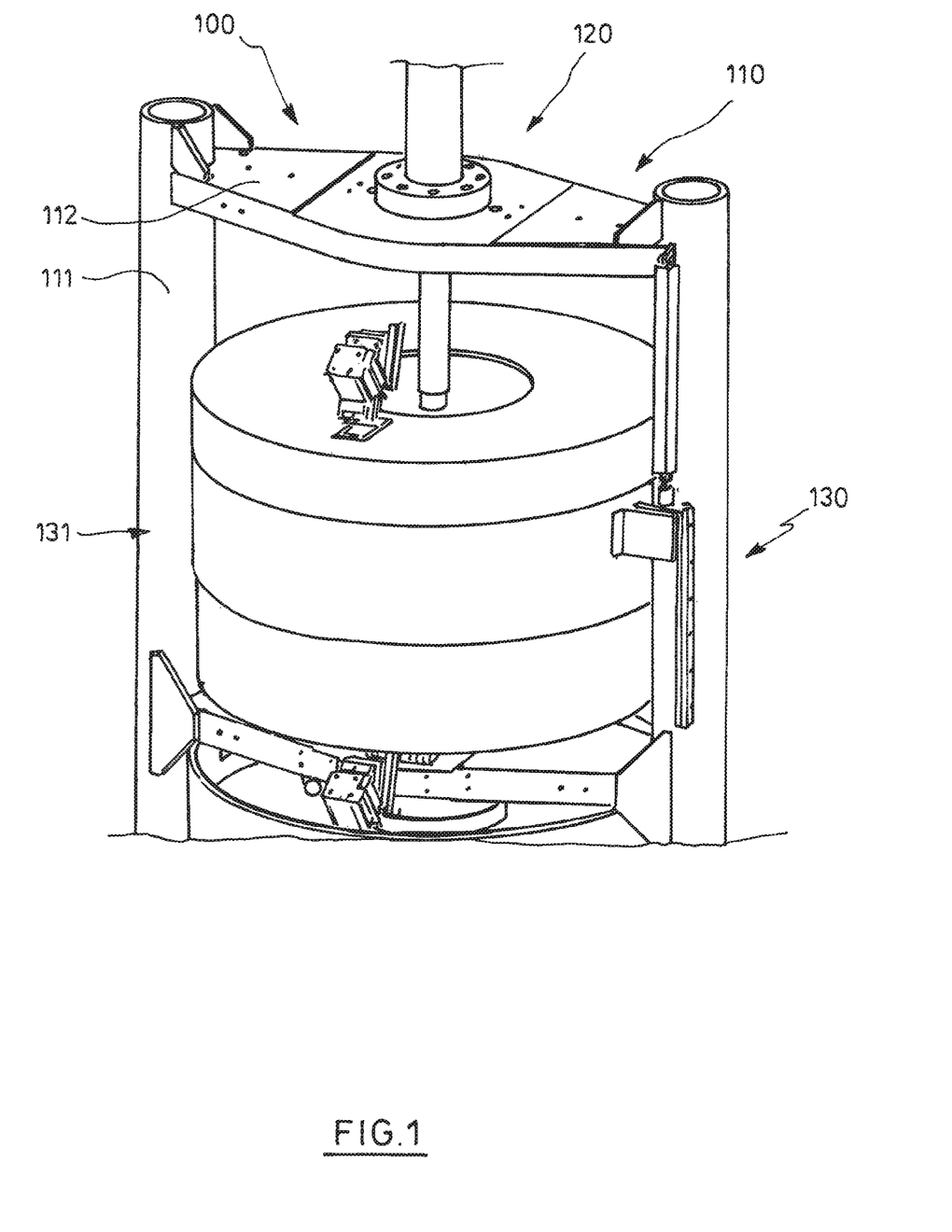
FIG. 1 shows a three-dimensional view of one illustrative embodiment of the device according to the invention for post-treating tyres, having a PCI and a PCD, wherein the upper insulating chamber for accommodating at least one tyre in the interior thereof in the closed position is depicted.

FIG. 1 shows a three-dimensional view of one illustrative embodiment of the device according to the invention for post-treating tyres (100), having a PCI (120) and a PCD (130). The primary component of the PCD (130) is an upper insulating chamber (131) (shown in the closed position in FIG. 1) of pot-shaped configuration, in the interior of which at least one finished tyre (200) can be accommodated. The device for post-treating tyres (100) preferably has a frame structure (110) formed by one column (111) with at least one bracket (112) or at least two columns (111) with at least one crossmember (112).

The essential component elements of the PCI (120) comprise at least means for clamping and sealing the tyre (200), preferably at the beads thereof, and device components for pressurizing the tyre interior, and are arranged within the insulating chamber (131).

Both the embodiment of the device for post-treating tyres (100) having one column (111) and a bracket (112 and that having at least two columns (111) and a crossmember (112) offer advantages and disadvantages. The embodiment having one column (111) and a bracket (112) supports radial accessibility of the PCI (120) and the PCD (130) through almost 360° but is less resistant to deformation. The embodiment baying two columns (111) and a crossmember (112) supports a very low-deformation and stable construction but offers less radial accessibility to the PCI (120) and the PCD (130).

Figure 2:
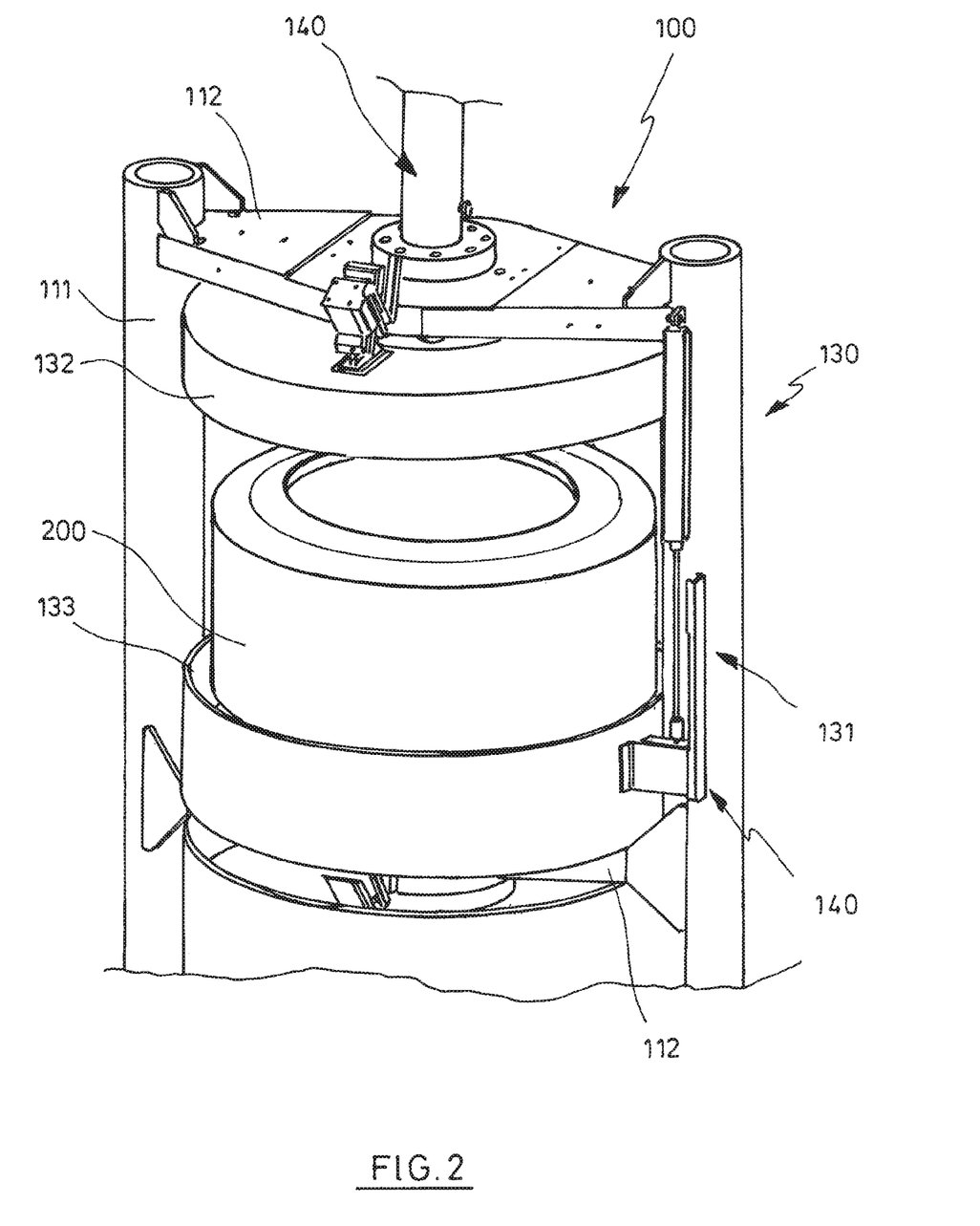
FIG. 2 shows a three-dimensional view of one illustrative embodiment of the device according to the invention for post-treating tyres, having a PCI and a PCD, with the insulating chamber in the open position.

FIG. 2 shows a three-dimensional view of the upper device for post-treating tyres (100) having a PCI (120) and a PCD (130), The insulating chamber (131) is constructed from at least one first chamber element (132) and one second chamber element (133) and these are preferably movable in an axially linear manner relative to one another, thus allowing access to the interior of the chamber for loading or unloading at least one tyre (200). The chamber elements (132, 133) are of cup-Shaped design with the result that the insulating chamber (131) has a pot-shaped configuration in the closed position. The axially linear movement path of the at least two chamber elements (132, 133) of the insulating Chamber (131) is dimensioned in such a way that a clear aperture width which corresponds at least to a lyre width is opened up.

In order to make the at least two chamber elements (132, 133) movable relative to one another, at least one of the chamber elements (132, 133) is arranged in an axially movable manner and is axially movable within the device for post-treating tyres (100) by means of a movement device (140). It is also possible for the design to make at least both chamber elements (132, 133) axially movable by means of a common movement device or by respective separate movement devices (140). The traveling movement is preferably linear and axial or axially device according to the invention for post-treating tyres (100).

The at least one movement device (140) can be implemented in various ways. In particular, consideration is given to arranging the movement device for a first chamber element (132) and/or a second chamber element (133) on the central axis of the device for post-treating tyres (100) and to construct it as a double-acting movement cylinder with an integrated linear guide or linearly guided piston rod based on a pneumatic, electric or hydraulic mode of operation.

Figure 3:
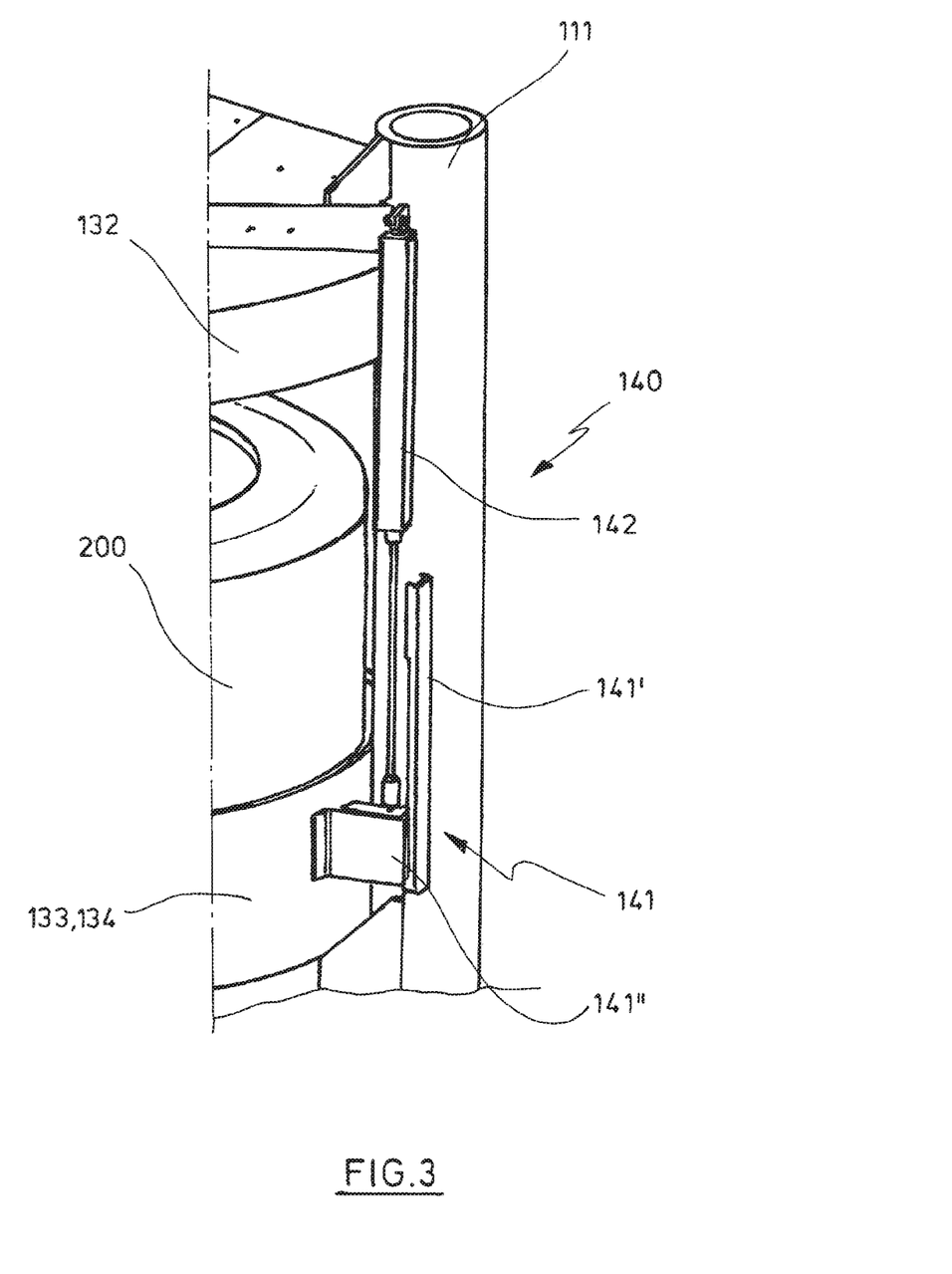
FIG. 3 shows a perspective depiction of a segment of the device according to the invention for post-treating tyres, having a movement device for the insulating chamber, said movement device being arranged eccentrically and parallel to the axis.

As an alternative or in addition, the movement device (140) can be arranged axially parallel and eccentrically with respect to the device for post-treating tyres (100), as illustrated in FIG. 3. This embodiment of the movement device (140) can be provided at least once per chamber element (132, 133, 134) and has at least two movement device components (141, 142) corresponding to the two functional tasks.

The first component consists in a linear guide (141) for implementing the guiding function. For this purpose, a guide rail (141') is preferably fixed on a column (111), the guiding profile of which interacts with a slotted link (141") in a movable manner and absorbs and supports the acting forces. A linear drive (142) based on a pneumatic, electric or hydraulic mode of operation fulfills the functional requirement of introducing the movement forces along the movement path and forms the second component of the movement device (140).

In this way, at least one of the movement devices (140) arranged on the central axis and/or axially parallel to the device for post-treating tyres (100) supports the axial movability of the at least two chamber elements (132, 133) relative to one another, thus enabling the interior of the chamber to be opened up for loading or unloading at least one tyre (200). If the respective movement stroke is utilized to the maximum, the chamber elements (132, 133) are in the open position or in the closed position.

Figure 4:
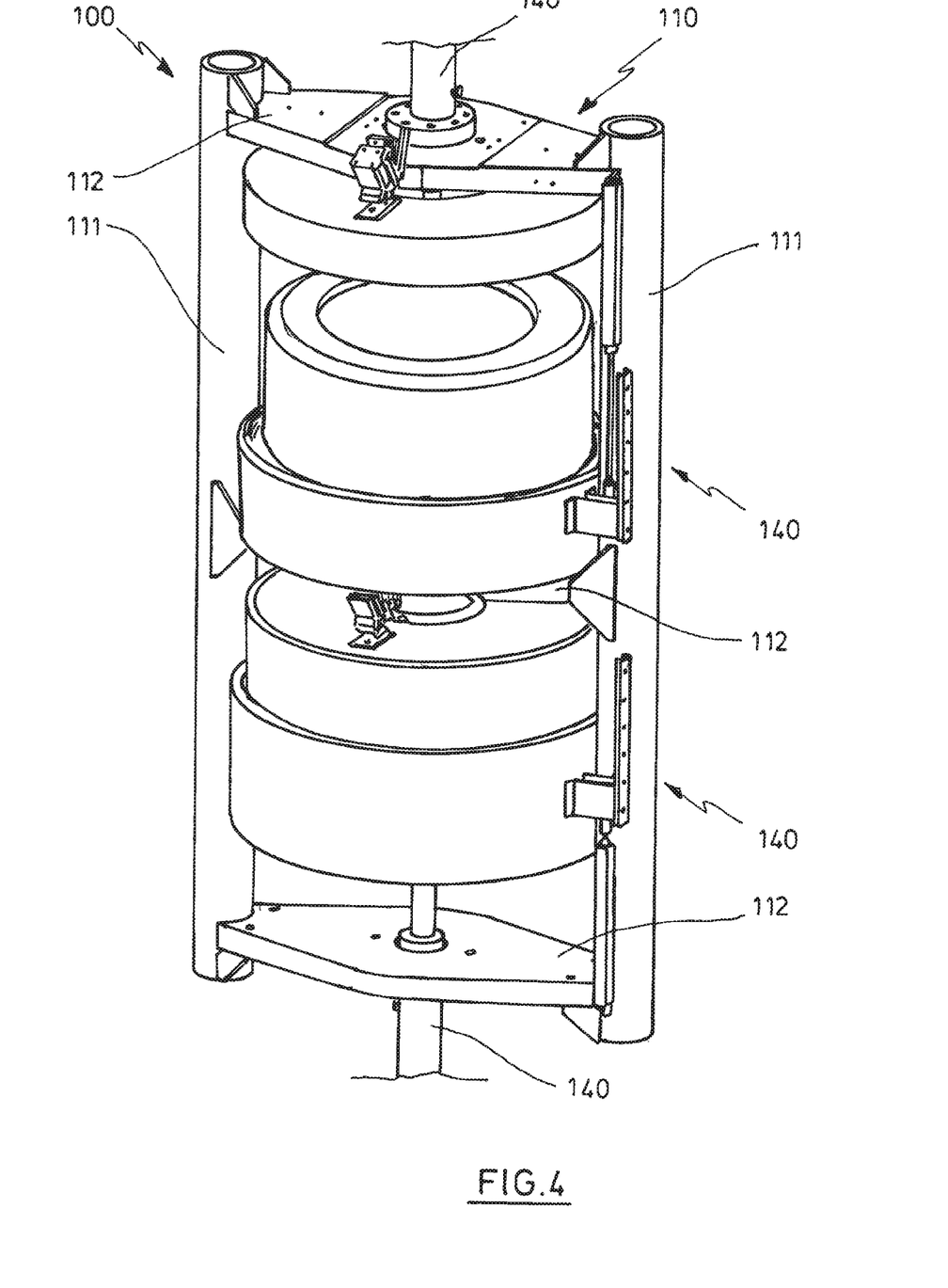
FIG. 4 shows a three-dimensional view of one illustrative embodiment of the device according to the invention for post-treating tyres, having two PCIS and two PCDs, wherein the respectively contained insulating chamber is open to receive at least one tyre in the upper case and closed in the lower case.

FIG. 4 shows the illustrative embodiment of the device according to ale invention for post-treating tyres (100) having two PCIs (120) and two PCDs (130), wherein the respectively contained insulating chamber (131) is open to receive at least one tyre in the upper case and closed in the lower case. In this example, the frame (110) is formed from two columns (111) with a total of three crossmembers (112), and the PCIs (120) and PCDs (130) are arranged axially in series as functional units and can thus carry out the tyre post-treatment steps for two heating cycles. The lower or, where applicable, the upper chamber then receives the next tyre in each case, which comes from the tyre vulcanizing machine (heating press).

Figure 5:
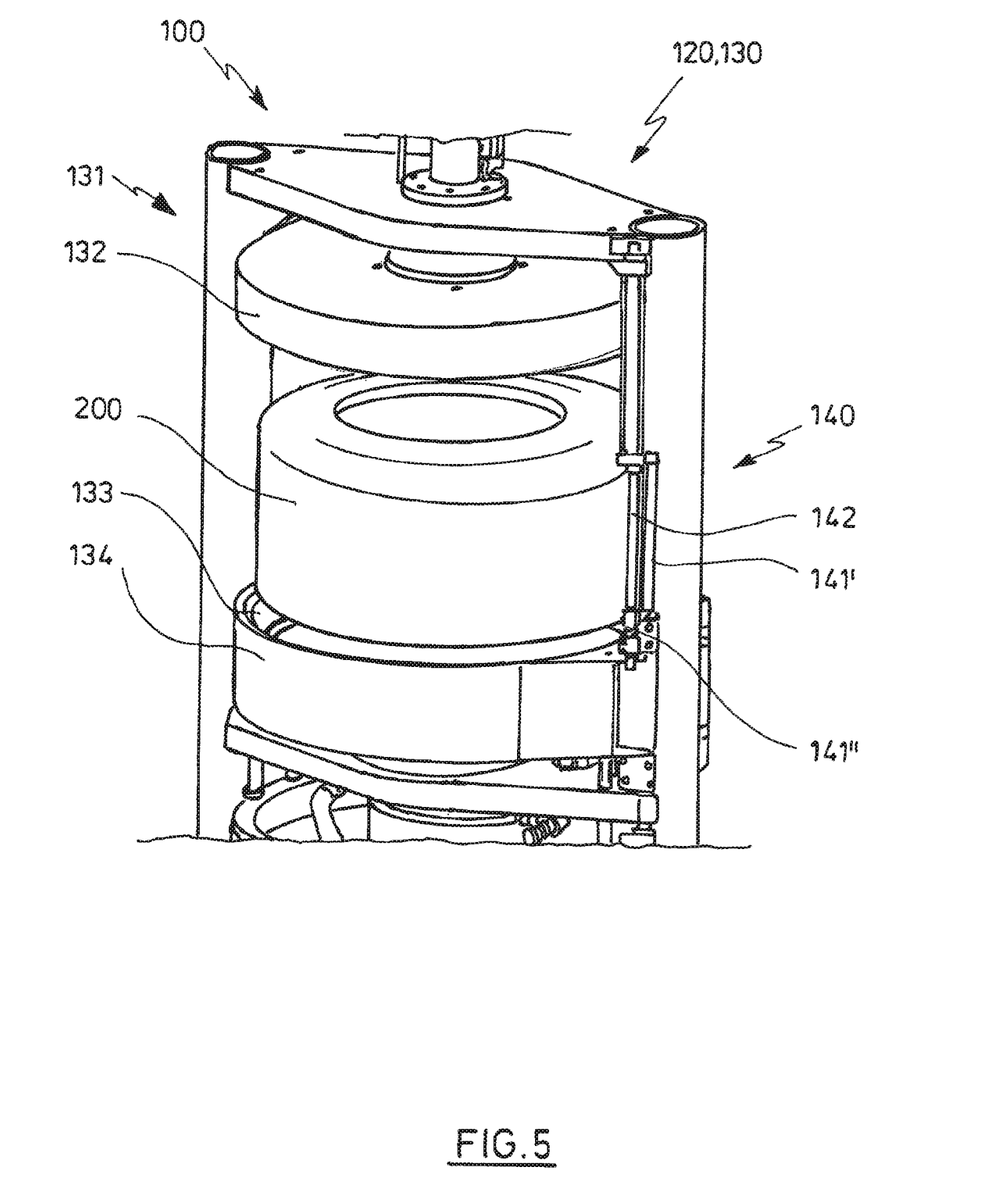
FIG. 5 shows, in a perspective view, the device for post-treating tyres in the open situation of the insulating chamber of the PCD with a finished tyre.

FIG. 5 illustrates in a perspective view of the device for post-treating tyres, the open situation of the insulating chamber (131) of the PCD (130) with a finished tyre (200). Here, the finished tyre (200) is shown in a suspended position, i.e. the situation at the moment of loading or unloading is shown, wherein the handling device for loading or unloading the insulating chamber (131) has been omitted from the illustration.

In the illustrative embodiment shown in FIG. 5, the insulating chamber (131) consisting of three chamber elements (132, 133, 134) is shown. Here, a first chamber element (132) and a second chamber element (133) form the upper and lower part, and a third chamber element (134) is embodied as a ring segment concentric with the first and second chamber elements (132, 133). At least two of the three chamber elements (132, 133, 134) are movable in a linear axial manner by means of one or more movement devices (140), allowing an open position and a closed position of the insulating chamber (131) to be adopted.

The advantage of this chamber configuration by means of three chamber elements (132, 133, 134) lies in the triple division of the preferably cylindrical chamber side wall. By virtue of this design configuration, it is possible to achieve the clear opening width by means of a considerably smaller movement path of the first chamber element (132) and of the second Chamber element (133) relative to one another and in this way to reduce the overall height of the entire device or of parts thereof. The decisive factor for the contribution to the reduction in the movement path or in the overall height of the device is the ring width of the third chamber element (134).

Figure 6:
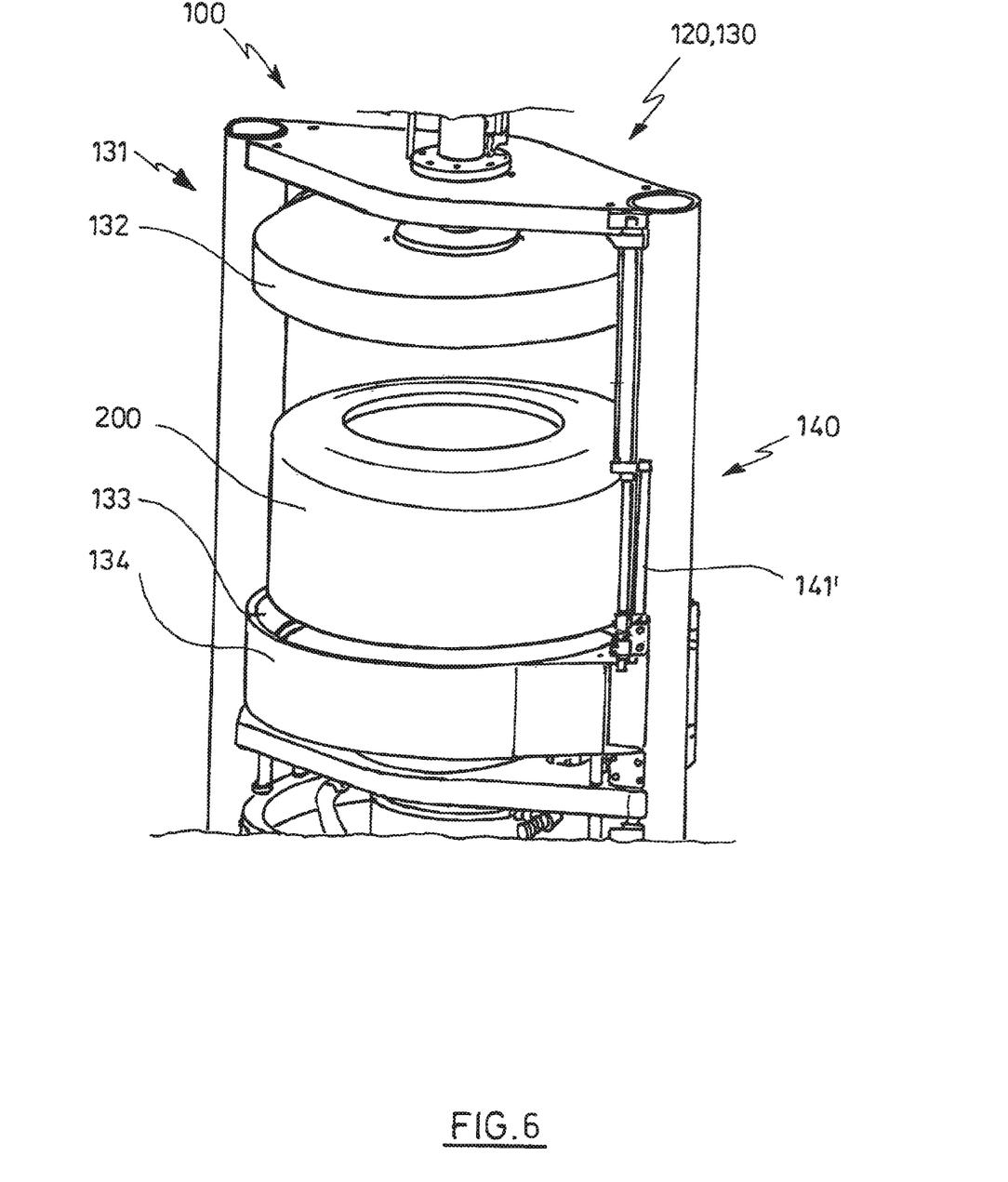
FIG. 6 shows the situation similar to FIG. 5 with a finished tyre deposited in the chamber.

FIG. 6 illustrates the situation similar to FIG. 5 with a finished tyre (200) deposited in the chamber (131).

Figure 7:
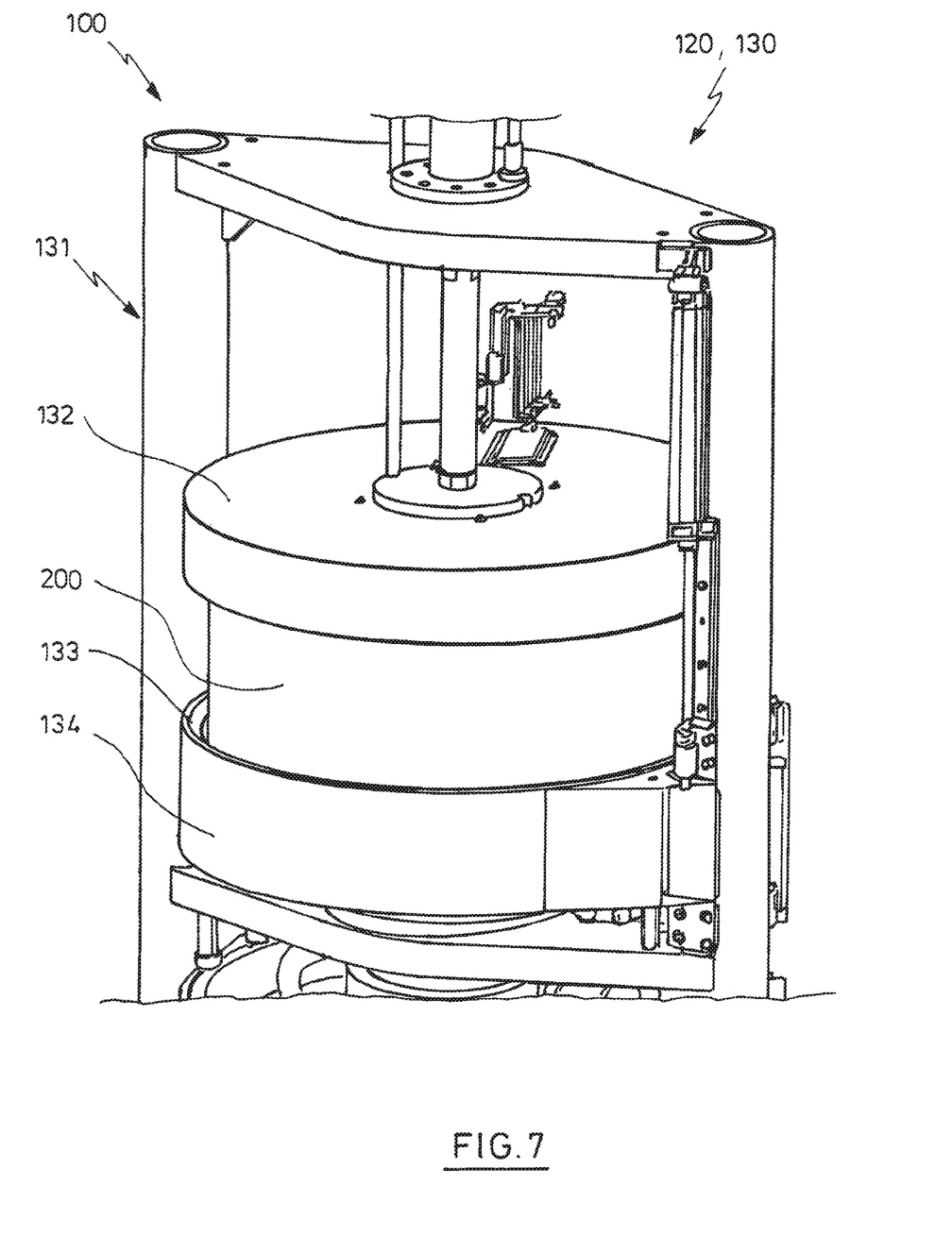
FIG. 7 shows the position of the lowered first chamber element.
Figure 8:
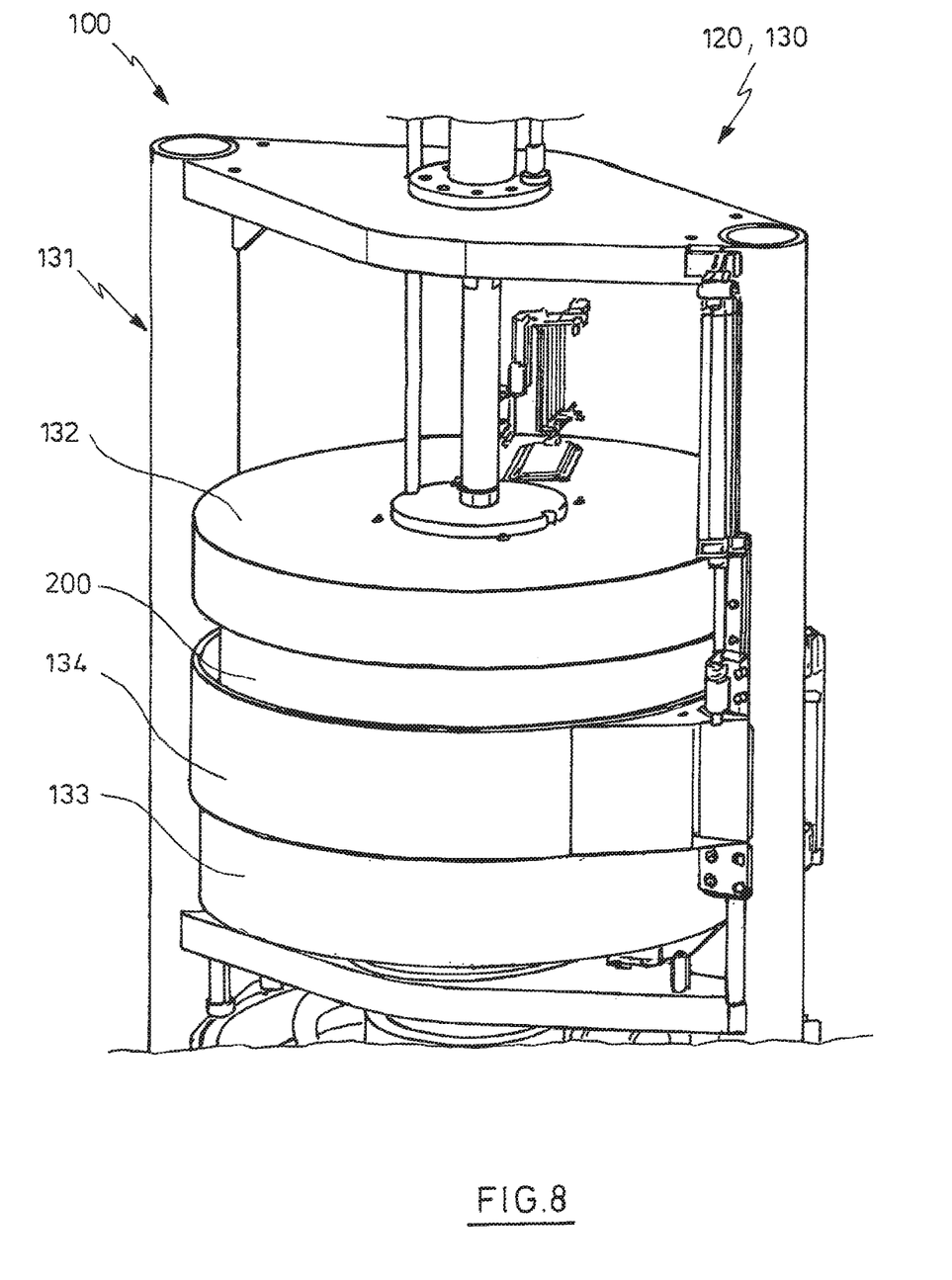
FIG. 8 shows the third chamber element in a position in which it has been moved partially in the direction of the closed position of the insulating chamber, as compared with FIG. 7.

FIG. 7 depicts the position of the lowered first chamber element (132) and in this way shows the insulating chamber (131) in the partially closed state. FIG. 8 shows the third chamber element (134) in a position partially moved in the direction of the closed position of the insulating chamber (131) relative to FIG. 7.

Figure 9:
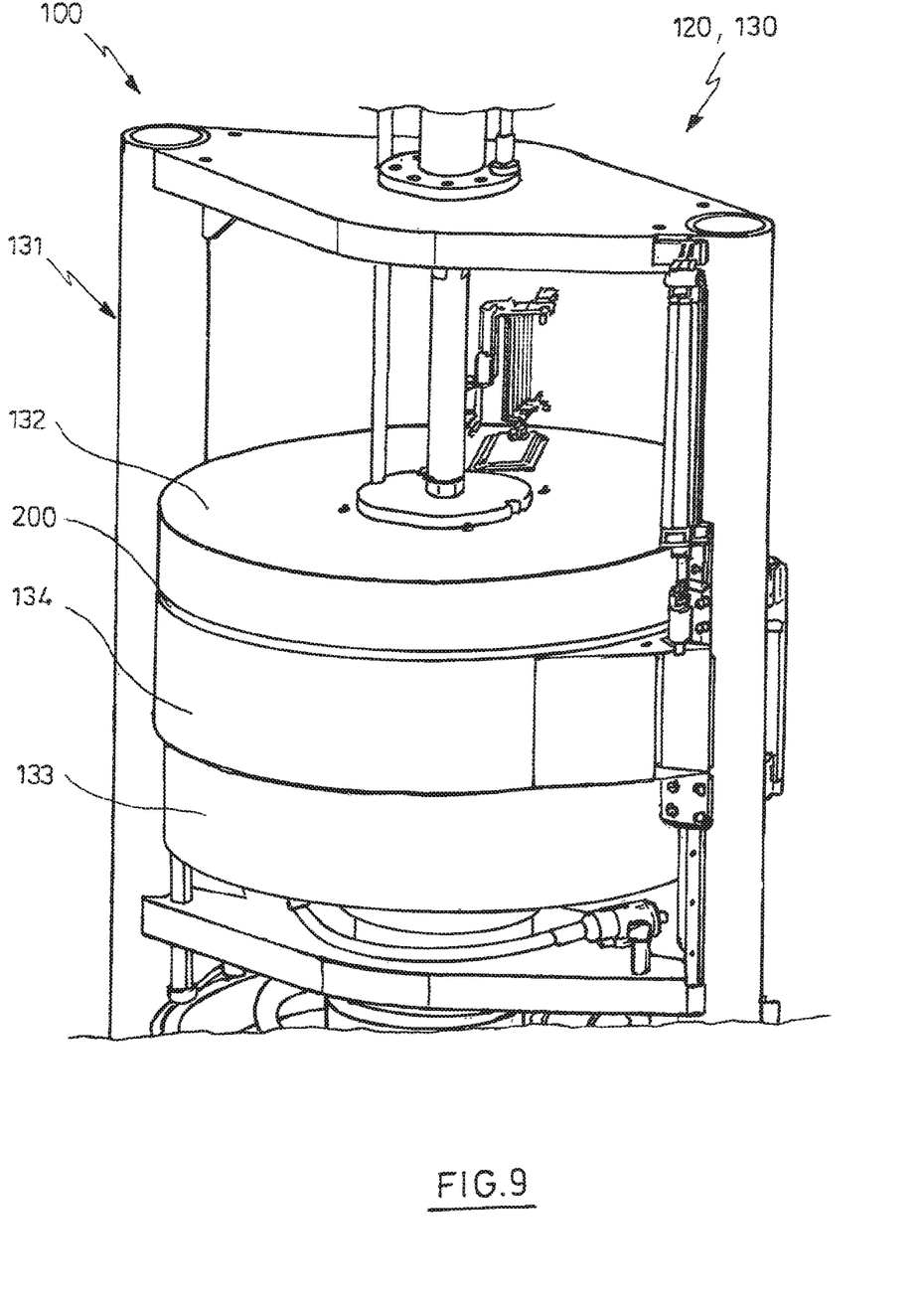
FIG. 9 shows, in a perspective view, the device for post-treating tyres in the closed position of the insulating chamber of the PCD.

FIG. 9 comprises, in a perspective view, the upper device for post-treating tyres (100) in the closed position of the insulating chamber (131) of the PCD. In this arrangement and position situation, the device for post-treating tyres (100) supports, in particular, step 1 according to the invention of slowly cooling the finished tyre (200) containing residual heat within the insulated chamber (131), wherein the temperature reduction to be performed in this process step is preferably implemented as controlled or monitored cooling of the finished tyre (200) containing residual heat to a lower temperature level, e.g. Tzw or Tu, Tr.

In order to implement this first step of slow cooling, the insulated chamber (131) surrounding the finished tyre (200) creates, in particular, a climate without disruptive influences of an ambient air temperature and/or of the air speed from the environment. The insulating effects of the insulating chamber (131) and of the chamber elements (132, 133, 134) can be designed in accordance with the required insulation properties and/or the required cooling rate.

For example, various materials with different insulation properties, such as ferrous or nonferrous metals, plastics and, in particular, high-temperature plastics, composite material, carbon materials or fiber-doped aluminum alloys, are provided.

It is furthermore possible according to the invention to modify the insulation and/or heat transfer properties by design, e.g. by means of a double-walled chamber construction with interior insulation material or coolant circulation within the double walls. A coolant heated in this way, in particular, can help with energy efficiency by being used for preheating purposes or being fed to a heat exchanger.

Another possibility for influencing the climate within the insulating chamber (131) consists in the controlled heating of the chamber walls, e.g. by means of a resistance heating system or the supply of temperature-controlled coolant in the case of a double-walled chamber embodiment.

As already explained above, an essential feature according to the invention consists in that the use of a PCI is combined with pressurization of the tyre interior with support gas.

Another essential feature according to the invention consists in that the cooling of the tyre from the first temperature level to the second temperature level takes place within a time period of precisely two heating cycles of the tyre vulcanizing machine.

The invention claimed is:

1. A device for post-treating tyres after a vulcanization process, comprising: at least one post-cure inflator (PCI) for pressurizing an interior of the tyre with support gas during a tyre cooling phase; and, a post-cure device (PCD) that at least partially surrounds the at least one PCI, wherein the PCD has at least one insulating chamber for accommodating at least one tyre and the insulating chamber has structurally produced insulating properties by virtue of a double-walled construction to ensure slow cooling, defined as cooling lasting at least 20 minutes, of the tyre from a first to a second temperature level, wherein an interior of the insulating chamber is temperature-controlled by a temperature control medium that circulates within the double-walled construction, wherein the insulating chamber is constructed from at least one first chamber element and one second chamber element movable in an axially linear manner relative to one another in a vertical direction along a longitudinal vertical axis of the device, wherein the first chamber element provides a top part of the insulating chamber and the second chamber element provides a bottom part of the insulating chamber, and wherein a third chamber element formed as a concentric ring is arranged between the first chamber element and the second chamber element, wherein the concentric ring is concentric with the first and second chamber elements, wherein the first chamber element is arranged vertically above the second chamber element, and wherein the third chamber element is movable in the vertical direction, wherein the third chamber element forms a portion of a wall of the insulating chamber at least in a closed state of the insulating chamber.

2. The device for post-treating tyres according to claim 1, wherein the insulating chamber of the PCD is formed at least partially from an insulating material.

3. The device for post-treating tyres according to claim 2, wherein the insulating material comprises ferrous or non-ferrous metal, plastic, composite material, carbon material or fiber-doped aluminum alloy.

4. The device for post-treating tyres according to claim 1, wherein at least one of the chamber elements is movable relative to at least one other of the chamber elements so that the insulating chamber is movable into an open position or a closed position.

5. The device for post-treating tyres according to claim 4, wherein the insulating chamber has a clear aperture width that corresponds to at least a tyre width in the open position.

6. The device for post-treating tyres according to claim 4, wherein a motion path for movement of the at least one chamber element is linear and axially parallel or axially congruent with respect to a central axis of the device for post-treating tyres.

7. The device for post-treating tyres according to claim 4, further comprising at least one movement device for moving the at least one chamber element.

8. The device for post-treating tyres according to claim 7, wherein the movement device for moving the at least one chamber element has two movement device components, wherein one component performs a guiding function and another component provides a movement function along a path.

9. The device for post-treating tyres according to claim 1, wherein the third chamber element is movable so that a vertical motion height for movement of the chamber elements between an open position and a closed position of the insulating chamber is supported.

10. The device for post-treating tyres according to claim 1, further comprising at least one frame having at least one column and a bracket for holding at least one of the PCI and the PCD.

11. A method for post-treating tyres containing residual heat after a vulcanization process, comprising the steps of:
    introducing at least one tyre containing residual heat into an insulating chamber of a post-cure device (PCD) within a device for post-treating tyres according to claim 1; and
    setting a climate independent of external influences within the insulating chamber of the PCD to ensure that slow cooling, defined as cooling lasting at least 20 minutes, of the tyre from a first to a second temperature level is supported.

12. The method for post-treating tyres according to claim 11, further including pressurizing an interior of the tyre with support gas in addition to the climate setting step as part of a post-cure inflator (PCI) process step.

13. The method for post-treating tyres according to claim 11, wherein the slow cooling of the tyre takes place from the first temperature level, which corresponds to a residual temperature of the tyre, to the second temperature level, which corresponds to ambient temperature.

14. The method for post-treating tyres according to claim 11, wherein the slow cooling of the tyre takes place from the first temperature level, which corresponds to a residual temperature of the tyre, to the second temperature level, which corresponds to an intermediate temperature, followed by cooling from the intermediate temperature level to an ambient temperature level.

15. The method for post-treating tyres according to claim 14, wherein the cooling of the tyre from the intermediate temperature level to the ambient temperature level takes place in a time period of at least one heating cycle of a tyre vulcanizing machine.

16. The method for post-treating tyres according to claim 11, wherein the slow cooling of the tyre from the first temperature level to the second temperature level takes place in a time period of two heating cycles of a tyre vulcanizing machine.

* * * * *